(12) United States Patent
Groen et al.

(10) Patent No.: US 6,357,911 B1
(45) Date of Patent: Mar. 19, 2002

(54) METHOD AND APPARATUS FOR PREDICTING THE EQUALIZED TEMPERATURE OF A FOOD PRODUCT

(75) Inventors: Michele L Groen, Piscataway; Mark T. Grace, Bridgewater, both of NJ (US); David G. Wardle, Walton-on-the-Hill (GB)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/464,978

(22) Filed: Dec. 16, 1999

(51) Int. Cl.[7] .................................................. G01K 7/00
(52) U.S. Cl. ...................................... 374/169; 702/130
(58) Field of Search ................................ 374/163, 169, 374/164, 5, 50, 107, 102, 141; 99/443 R, 342; 702/130–136

(56) References Cited

U.S. PATENT DOCUMENTS

| | | | | |
|---|---|---|---|---|
| 4,854,726 A | * | 8/1989 | Lesley et al. | 374/45 |
| 4,986,669 A | * | 1/1991 | Yamaguchi | 374/107 |
| 5,066,141 A | * | 11/1991 | Ikeda et al. | 374/169 |
| 5,259,389 A | * | 11/1993 | Muramoto et al. | 128/736 |
| 5,392,031 A | * | 2/1995 | Toriumi et al. | 374/169 |
| 5,683,605 A | * | 11/1997 | Matsuoka | 374/107 |
| 5,738,441 A | * | 4/1998 | Cambridge et al. | 374/102 |
| 6,076,964 A | * | 6/2000 | Wu et al. | 374/141 |

FOREIGN PATENT DOCUMENTS

| | | |
|---|---|---|
| DD | 253 938 | 2/1998 |
| DE | 40 32 949 | 4/1992 |
| EP | 0 492 983 | 7/1992 |
| JP | 04 370068 | 12/1992 |

* cited by examiner

Primary Examiner—Diego Gutierrez
Assistant Examiner—Gail Verbitsky
(74) Attorney, Agent, or Firm—Joshua L. Cohen; Salvatore P. Pace (57) ABSTRACT

In the processing of an item, particularly a food item, where the final equalized temperature is important to the processing a method and apparatus for predicting the equalized temperature is disclosed. A series of infrared sensors is used to measure the rate of change of the surface temperature of an item after the item is exposed to a known thermal shock such as heating or cooling. The predicted equalized temperature can be calculated from the series of surface temperatures using least squares, non-linear regression techniques. One means for applying a thermal shock to an item would be the use of cryogens such as liquid nitrogen, carbon dixoide snow or synthetic liquid air (SLA).

19 Claims, 7 Drawing Sheets

METHOD AND APPARATUS FOR PREDICTING THE EQUALIZED TEMPERATURE OF A FOOD PRODUCT

BACKGROUND OF THE INVENTION

The present invention relates to a method and apparatus for determining a prediction of the equalized temperature of a food product prior to the food product reaching its thermal equilibrium. More specifically, this invention is a method and apparatus for predicting such equalized temperature based on the response of the food product to thermal shocks.

The food industry produces a large quantity of standardized food products. In order to control the processes used to make standardized food products the industry is relying to a greater extent on electronic control systems which monitor various food manufacturing processes and input variables in order to control the quality of the food product as well as to minimize waste and decrease costs.

One problem associated with the processing of food items is determination of the equalized temperature of the food item. The need for temperature measurement is particularly acute in the area of food cooking and/or frying systems where high heat transfer rates result in a significantly hotter surface surrounding a cooler core. The goal is to reach a certain equalized temperature for the entire food item which takes a certain amount of time to achieve while also minimizing the amount of energy required to achieve the equalized temperature. Likewise, for cryogenically cooled or frozen foods there is a need to have food items reach a certain equalized temperature specified by the needs of the food item while using the least amount of cryogen.

An intrusive method of temperature determination such as the use of a temperature probe which is inserted into a food item has severe limitations in measuring the equalized temperature of a food item in a continuous food processing environment. The temperature probe must be manually inserted into a food item which cannot then be further processed resulting in waste. Also, the amount of labor needed to monitor a significant number of food items invasively would be cost prohibitive. Furthermore, the actual equalized temperature can only be measured after a certain amount of time passes, perhaps as much as ten or twenty minutes, and, therefore, a large number of food items could be incorrectly processed before an error in the equalized temperature is detected.

Another prior art method of temperature measurement such as a single infrared sensor would only be capable of measuring the surface temperature of the product and not the equalized temperature throughout the product.

In light of the foregoing, there is a need in the art for a method and apparatus which enables a food processor to predict or estimate the equalized temperature of a food item in a food processing line in a continuous manner without diverting actual food items from the processing line and using intrusive manual temperature testing. Furthermore, the method and apparatus need to allow the food processor to predict the equalized temperature of the food items immediately after a thermal shock is applied, i.e., cooking or cooling, , rather than after they have actually reached their equalized temperature, so that problems with the cooking process or cooling/freezing cryogenic process can be corrected in real-time.

SUMMARY OF THE INVENTION

Accordingly, the present invention is directed to a method and apparatus for continuous prediction of the equalized temperature of a food item during processing.

Furthermore, the invention is directed to a method and apparatus for estimating such equalized temperatures in conditions of variable air flow and variable temperatures found in food processing.

In addition, the invention is directed to a method and apparatus which is non-intrusive and will not cause damage to food items.

To achieve these and other advantages and in accordance with the purpose of the invention, as embodied and broadly described herein, the invention includes an apparatus having an infrared sensor for measuring the surface temperature of a food item and means for applying a heat transfer shock of known quantity to the food item for a set length of time. At least two measurements of the surface temperature of the item are taken at specific times after the initial thermal shock and the equalized temperature of the food item is mathematically predicted from the two measurements.

In one aspect of the present invention the thermal shock and surface temperature measurement process is repeated in order to increase the accuracy of the predicted temperature.

In another aspect of the present invention multiple surface temperature readings are taken after each application of thermal shock with feedback mechanisms to alter the magnitude of the thermal shock.

In a further aspect of the present invention a plurality of infrared sensors are mounted over a food processing line so that food items pass under the plurality of sensors and an equalized temperature is predicted for a food item based on the readings from the plurality of sensors.

In a still further aspect of the invention the information as to the predicted equalized temperature of the food product is logged in a computer database for use by the food processing system and for purposes of altering the magnitude of additional thermal shocks to the food items.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings.

In accordance with the invention, an apparatus and method for the prediction of the equalized temperature of a food item is disclosed in FIGS. 1–7.

Figure 1:
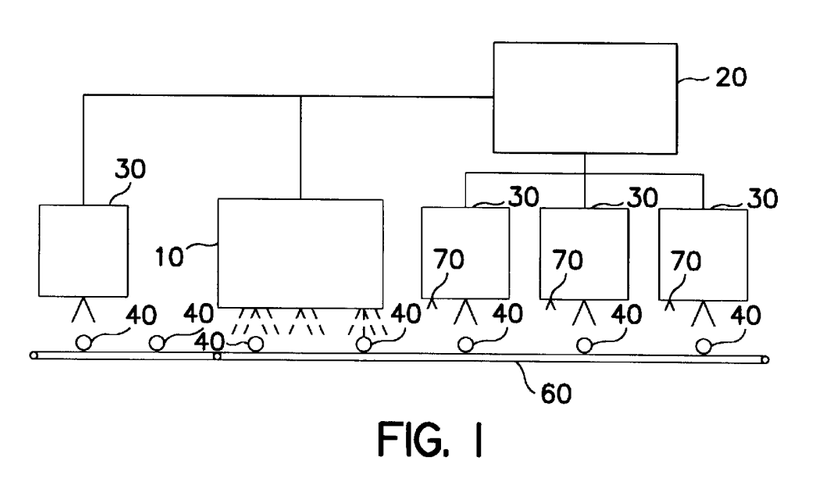
FIG. 1 is a diagram of an embodiment constructed according to the present invention.

In FIG. 1 a diagrammatic representation of the an apparatus according to the present invention is depicted. Food items 40 placed on conveyer 60 travel under a first infrared sensor 30 which provides a measure of the surface temperature of the food item 40. A thermal shock is applied to food items 40 through a means for providing a thermal shock 60 which could be a cryogenic sprayer for spraying liquid or vapor phase cryogen on food items 40 or an infrared heat source for heating food items 40. One skilled in the art will realize that there are many means for providing a thermal shock to food items 40 including but not limited to infrared, microwave, inductive, convective or conductive heating and mechanical refrigeration or cryogenic cooling or freezing. Cryogenic cooling could be accomplished through the use of cryogens such as liquid nitrogen, carbon dioxide snow or synthetic liquid air (SLA). After receiving a thermal shock food items 40 are carried by conveyer 60 under a series of infrared sensors 30 which each provide a signal to controller 20 indicative of the surface temperature of the food items 40 over a period of time. This sequence of events can be repeated one or more times. The variation of the rate of temperature change can be used to indicate the predicted equalized temperature of the product. Controller 20 can use the data regarding the predicted equalized temperature of the food product or items in order to control the means for providing a thermal shock 10 to the food items 40. Controller 20 could be a programmable logic controller (PLC) or other programmable computer such as a personal computer.

Figure 2:
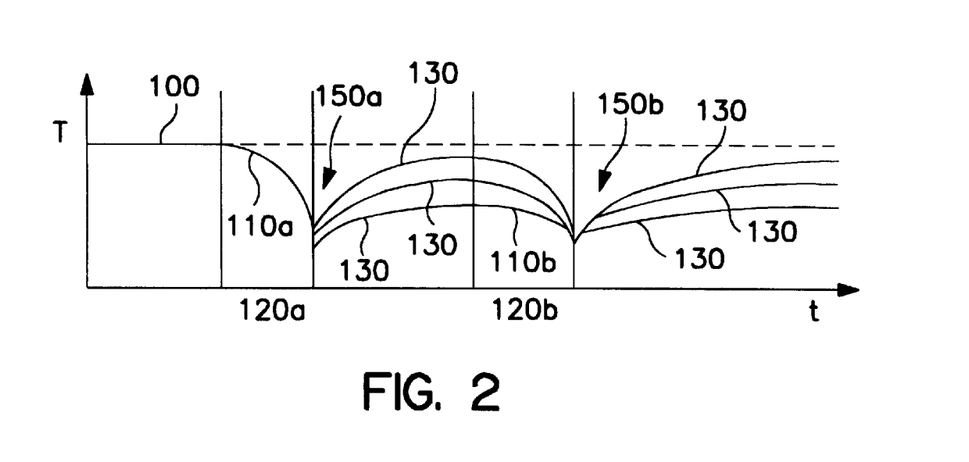
FIG. 2 is a graph depicting the temperature curves resulting from the application of the embodiment of FIG. 1.

The process described in regard to FIG. 1 results in a graph similar to that of FIG. 2. Reading 100 represents the temperature of a food item prior to application of the thermal shock. During time periods 120a a thermal shock is applied to the food items which is a cryogenic shock as depicted in FIG. 2 such that the temperature of the food item decreases as depicted in portion 110a of the temperature versus time plot of FIG. 2. After application of the thermal shock a series of temperature readings 130 are taken by infrared sensors 30. As expected the readings indicate a warming of the exterior of the food item over time as the heat from the warmer core of the food item is thermally transferred to the exterior of the item. An additional thermal shock during time period 120b decreases the temperature of the food item 40 as seen in portion 110b of FIG. 2. The difference in the rate of change of the temperature readings 130, i.e., the difference between the slopes 150a and 150b is indicative of the core temperature of the product.

Figure 3:
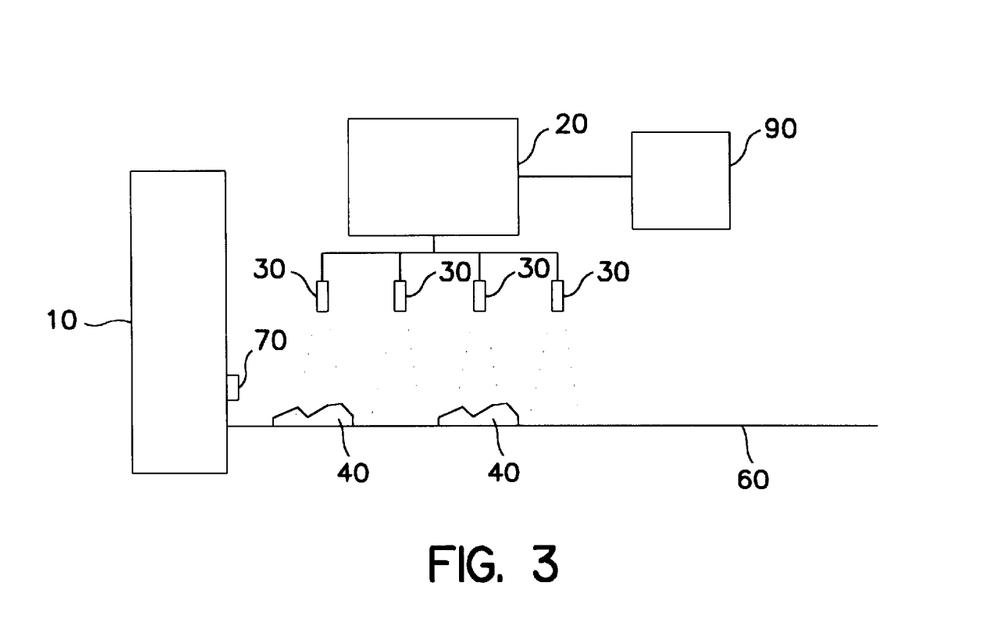
FIG. 3 is a diagram of a second embodiment of the present invention.
Figure 4:
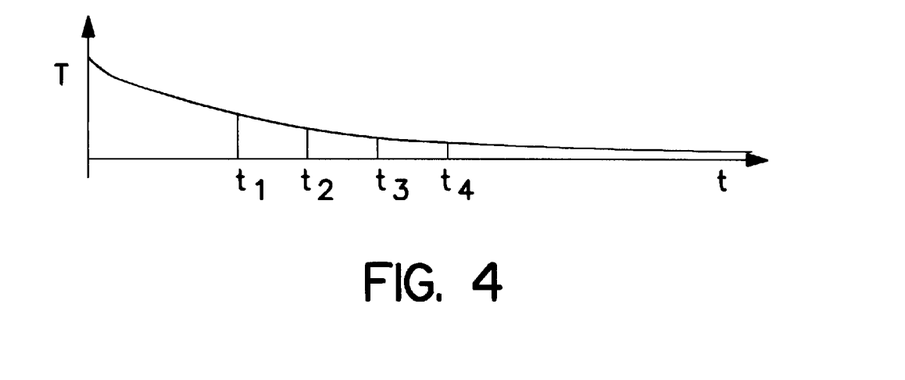
FIG. 4 is a graph depicting a plurality of temperature readings taken over time, t.

In FIGS. 3–4 a preferred embodiment of the present invention in which a means for applying a thermal shock is a cooker 10 which heats food items 40. The food items 40 are then carried by conveyor 60 under a plurality of infrared sensors 30 which each provide a peak reading (T1, T2, T3, T4) for each food item. A plurality of optical sensors 70 are used to determine when a food item is passing under the infrared sensors 30. Using a set of known factors which are product specific the final equalized temperature is calculated which can be supplied to a memory device 90 for use in the processing of the food items 40.

To calibrate the series of infrared sensors it is necessary to record a minimum of five sets of temperature readings and the equalized temperature. The data is then supplied to a series of simultaneous equations set forth below in equation [1].

$$T1x_1 + T2x_2 + T3x_3 + T4x_4 = T_{equal} \quad [1]$$

Figure 5:
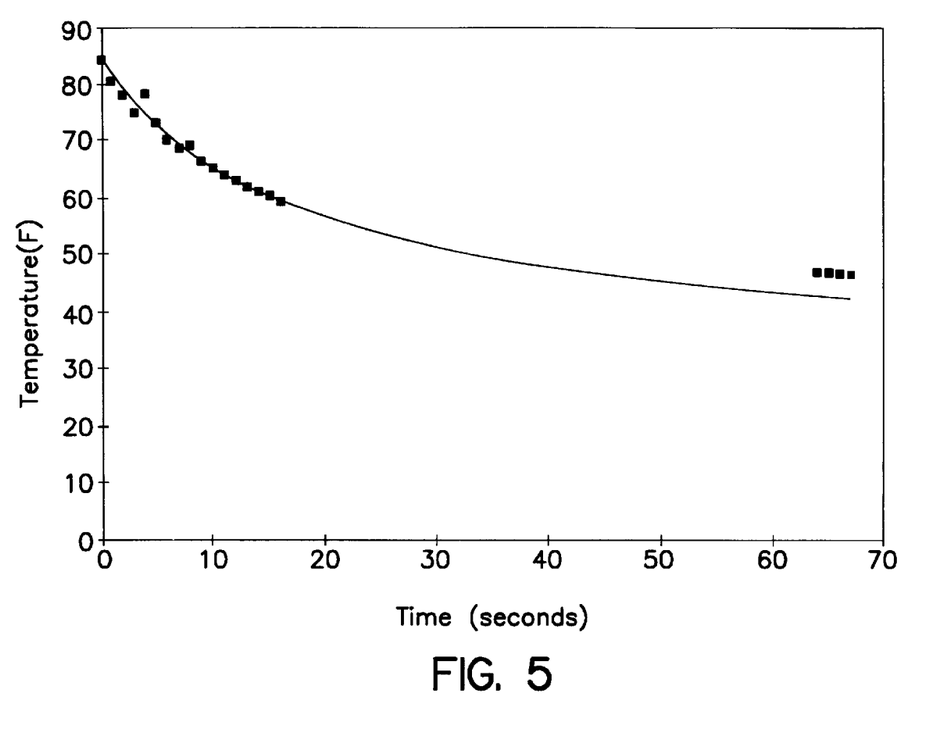
FIG. 5 is a graph depicting a first set of measured and calculated results.
Figure 6:
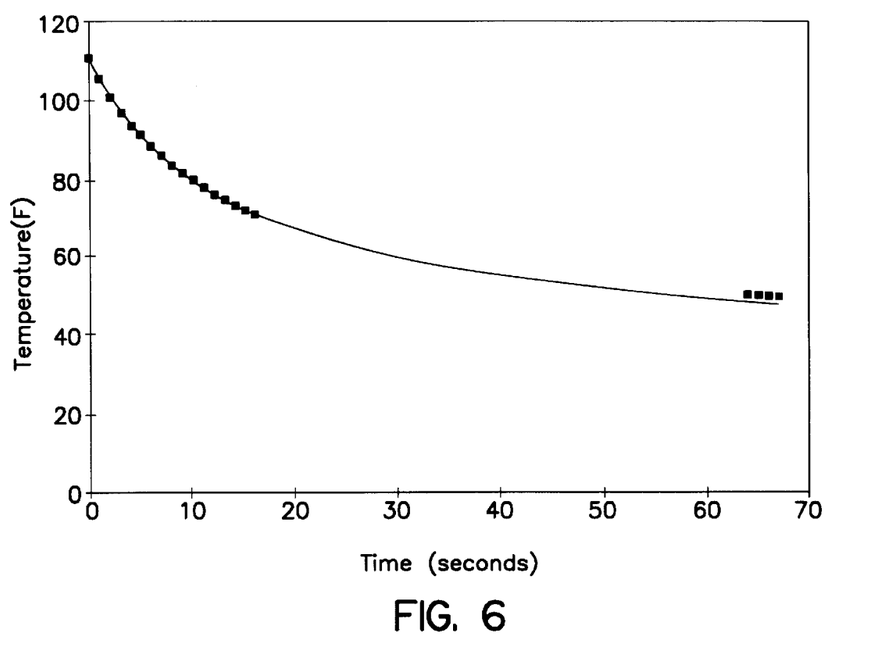
FIG. 6 is a graph depicting a second set of measured and calculated results.

FIGS. 5 and 6 depict data from two sets of experiments comparing measured equalized temperatures with calculated equalized temperatures using the above method. The results show that the equalized temperatures can be predicted within +−5%.

Figure 7:
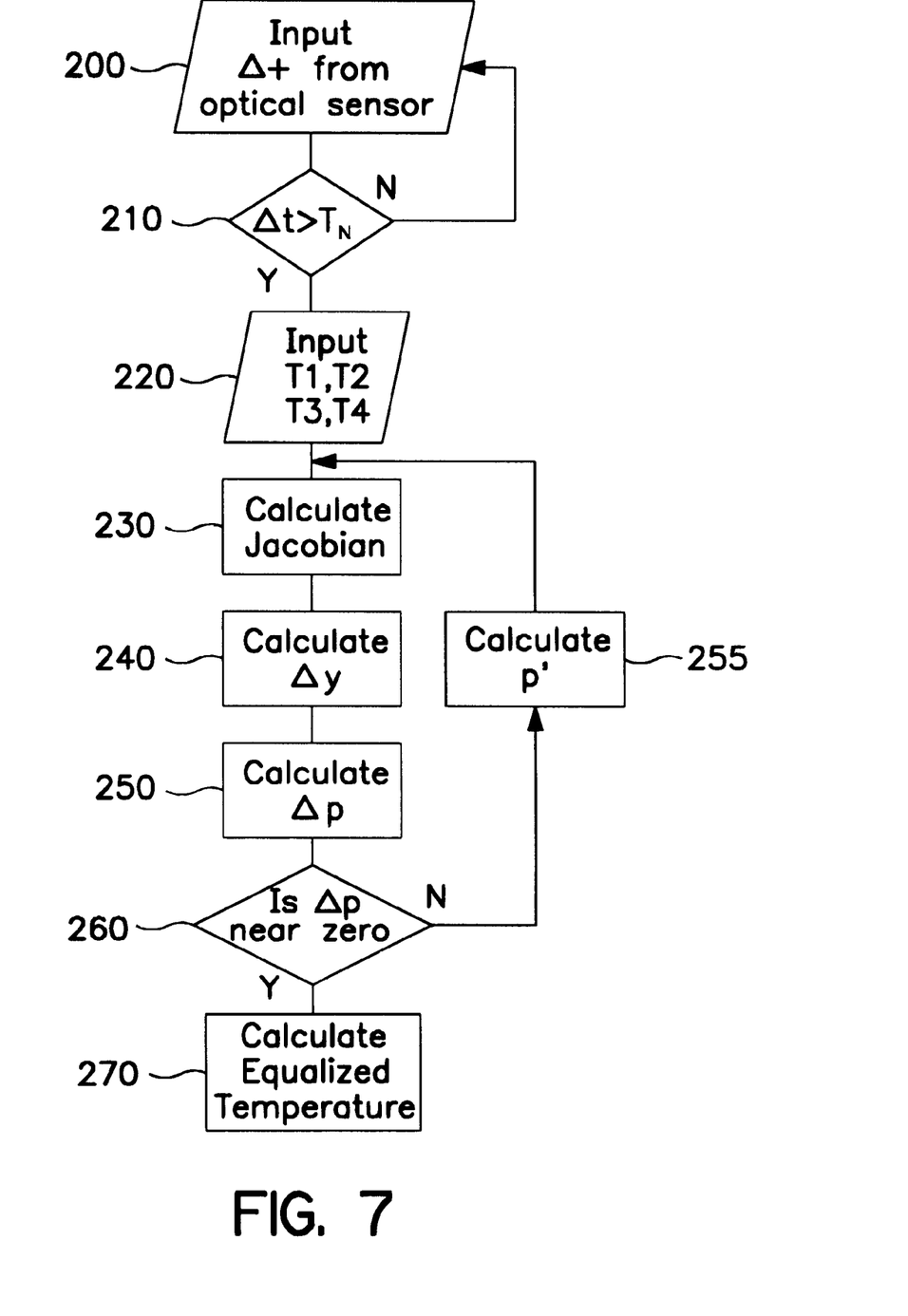
FIG. 7 is a flow diagram of the prediction method used in the present invention.

FIG. 7 is a flow diagram of the method of predicting the equalized temperature of a food item. At steps 200 and 210 an input from optical sensor 70 indicates when a plurality of food items 40 has exited the means for providing thermal shock 10 and indicates that a plurality of reading T1, T2, T3 and T4 should be input from the infrared sensors 30 in step 220.

In a continuous process the readings in step 220 are taken when the optical sensor indicated that the elapsed time since a food item has passed under the sensor is greater than the time necessary for the item to pass under all four infrared sensors 30 ($T_N$) for a given belt speed (BS). The peak readings of each infrared sensor 30 are then used to calculate the equalized temperature.

In a discrete process the readings of the infrared sensors are time tagged and recorded at specific times for a specific food item and after all four readings are taken for a specific food item the calculation of the equalized temperature begins.

Independent of the use of the continuous or discrete method of capturing the temperature readings T1, T2, T3, T4 from infrared sensors 30 the next step is to calculate the Jacobian (J) using three sets of data, time (matrix x), temperature readings T1, T2, T3 and T4 (matrix y) and a convergence criterion, matrix p. The temperature readings T1, T2, T3 and T4 as well as the time at which they were taken are known. The set of convergence criteria, p, is initially a guess which is continuously recalculated lo until the change in the convergence criteria is negligible. A non-linear regression algorithm based on a Taylor expansion is used where second and higher order terms of the model parameters are neglected on the condition that perturbation in those terms will be small. Thus the Jacobian is represented below in equation [2].

$$J = \begin{bmatrix} \exp\left(p_0 + \frac{p_1}{\sqrt{p+x}}\right), & \frac{1}{\sqrt{p+x}} \cdot \exp\left(p_0 + \frac{p_1}{\sqrt{p+x}}\right), & -\frac{1}{2} \cdot p_1 \cdot (p+x)^{-3/2} \cdot \exp\left(p_0 + \frac{p_1}{\sqrt{p+x}}\right) \\ x_1 & x_1 & x_1 \\ x_2 & x_2 & x_2 \\ x_3 & x_3 & x_3 \\ x_4 & x_4 & x_4 \end{bmatrix} \quad [2]$$

After calculation of the Jacobian matrix J for a given set of temperatures, times and convergence criteria (the Jacobian matrix J will be different for different model assumptions) the next step 240 is to calculate the difference ($\Delta y$) between the experimental values for y and those predicted by the model using the following equation [3].

$$\Delta y = y - \exp\left(p_0 + \frac{p_1}{\sqrt{p_2 + x}}\right) \quad [3]$$

In step 250 a set of corrections to originally predicted values for convergence criteria, p, is calculated using the following equation [4].

$$\Delta p = (J^T \cdot J)^{-1} \cdot J^T \cdot \Delta y \quad [4]$$

If $\Delta p$ is near zero then the equalized temperatures may be calculated. If not, then a new set of convergence criteria is calculated in the p'=p+$\Delta p$. The calculation of the Jacobian matrix, J, and $\Delta y$ is reiterated until $\Delta p$ approaches zero at which point the equalized temperature y can be calculated using equation [5].

$$y = \exp\left(p_0 + \frac{p_1}{\sqrt{p_2 + x}}\right) \quad [5]$$

Although the present discussion and embodiments discuss a method of predicting the equalized temperature of a food item the process could be applied to non-food items which are heated or cooled and for which the final temperature of the item is important. The food or non-food items may be liquids, solids or mixtures thereof.

Figure 8A:
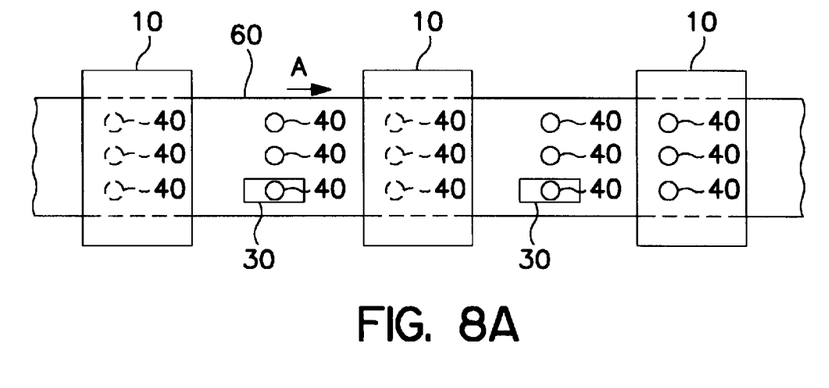
FIGS. 8A and 8B are top plan views of two possible embodiments according to the present invention.
Figure 8B:
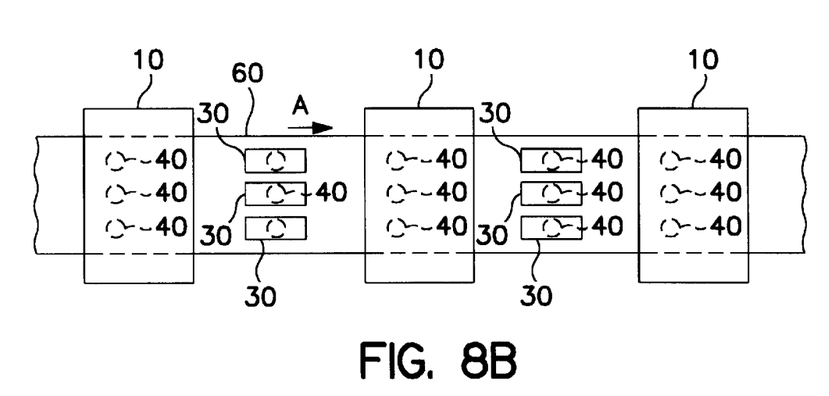

FIG. 8A depicts the top plan view of a system according to the present invention in which food items 40 are conveyed on belt 60 in direction A. Food items 40 are subject to thermal shocks using a means for applying thermal shocks 10 which as stated above may be a cryogenic sprayer, mechanical refrigerator, fryer, cooker, inductive heating element, conductive heating or cooling element, convection heater, infrared heater or other heating or cooling means. A single infrared sensor 30 is placed so as to measure the temperature of one food, item across the width of the belt. FIG. 8B depicts a top plan view of a similar system wherein a plurality of infrared sensors 30 are used to measure the temperatures of a plurality of food items across the width of the belt so as to insure that the food items across the belt are being processed in a like manner.

In a preferred embodiment of the present invention a first means for providing a thermal shock 10 would be a cooker, fryer or other heating means which would partially or fully cook a food item. A first Infrared sensor 30 placed after the first means for applying the thermal shock 10 enables the system to predict the equilibrium temperature of the food item 40 after cooking. This will then enable the controller 20 to regulate the amount of cryogen or mechanical refrigeration needed to cool and/or freeze the partially or fully cooked food item using the next means for applying thermal shock 10. A series of means for applying thermal shocks 10 as heat interspersed by sensors 30 can be used to control the final hot temperature of food items 40 while minimizing the amount of thermal energy needed to achieve a desired end result. Likewise, a series of means for applying thermal shocks 10 as cold can be used to control the final temperature of food item 40 while minimizing the amount of energy needed to achieve the desired end result.

In such a cooking then freezing process it is possible to overheat the food thereby increasing the frying cost as well as the cost of energy required to freeze the product. For example where a product is overheated by 10 degrees Fahrenheit in a gas fired cooker where the product is being processed at 5000 pounds per hour it is estimated that the cost of the energy unnecessarily expended exceeds $12 per hour.

Although the present invention has been discussed with reference to a preferred embodiment, as will occur to those skilled in the art, numerous changes, additions and omissions may be made without departing from the spirit and scope of the present invention.

We claim:

1. An apparatus for predicting an equalized temperature of an item comprising:
   means for providing a thermal shock to said item;
   at least one sensor for determining a surface temperature of said item; and
   means for predicting a value of the equalized temperature of said item from a rate of change of the surface temperature of said item after said thermal shock and before said item reaches the equalized temperature.

2. The apparatus of claim 1 further comprising a conveyor for moving said item from contact with said means for providing thermal shock.

3. The apparatus of claim 2 further comprising an optical sensor for determining when surface temperature should be determined using said at least one sensor.

4. The apparatus of claim 1 wherein at least one sensor is an infrared sensor.

5. The apparatus of claim 1 wherein said means for providing a thermal shock to said item applies cold to said item.

6. The apparatus of claim 1 wherein said means for providing a thermal shock to said item applies heat to said item.

7. The apparatus of claim 5 wherein said means for providing a thermal shock to said item applies a cryogen to said item.

8. The apparatus of claim 7 wherein the cryogen is selected from the group consisting of liquid nitrogen, carbon dioxide snow and synthetic liquid air.

9. The apparatus of claim 1 further comprising a means for storing a plurality of predicted equalized temperatures for a plurality of items.

10. The apparatus of claim 1 further comprising a controller for controlling is the means for providing a thermal shock to said item using at least one of the predicted equalized temperatures of said item.

11. The apparatus of claim 1 further comprising a second means for providing a thermal shock to said item and a controller for controlling said second means for providing a thermal shock using at least one of the predicted equalized temperatures of said item.

12. A method for predicting an equalized temperature of an item during processing of the item comprising the steps of:
   applying a thermal shock to said item;
   measuring a surface temperature of said item; and
   calculating a predicted value for the equalized temperature of the item based on a first rate of change of the surface temperature of said item after applying said thermal shock and before said item reaches the equalized temperature.

13. The method of claim 12 further comprising the steps of: applying at least one additional thermal shock to said item to provide a second rate of change of the surface temperature of said item, and calculating another predicted value for the equalized temperature of the item based on the difference between said first and said second rate of change of the surface temperature of said item.

14. The method of claim 13 wherein the step of measuring comprises at east two measurements of the surface temperature of said item over time.

15. The method of claim 14 wherein said at least two measurements are taken at separate and discrete time intervals.

16. The method of claim 12 wherein the step of calculating the predicted value includes an algorithm based on least squares, non-linear regression techniques.

17. The method of claim 12 further comprising the step of: using the predicted value for the equalized temperature to control at least one of a magnitude and a duration of the thermal shock applied to said item.

18. The method of claim 12 wherein a first thermal shock is applied to said item using heat and the predicted value of the equalized temperature is used to control the temperature of the heat applied to said item.

19. The method of claim 14 wherein a first thermal shock is applied to said item using heat and the predicted value of the equalized temperature is used to control a duration that said item is subject to heating.

* * * * *